Feb. 23, 1960
C. E. DARNELL
2,925,872
SUBSOILER FARM TOOL
Filed April 5, 1957
2 Sheets-Sheet 1
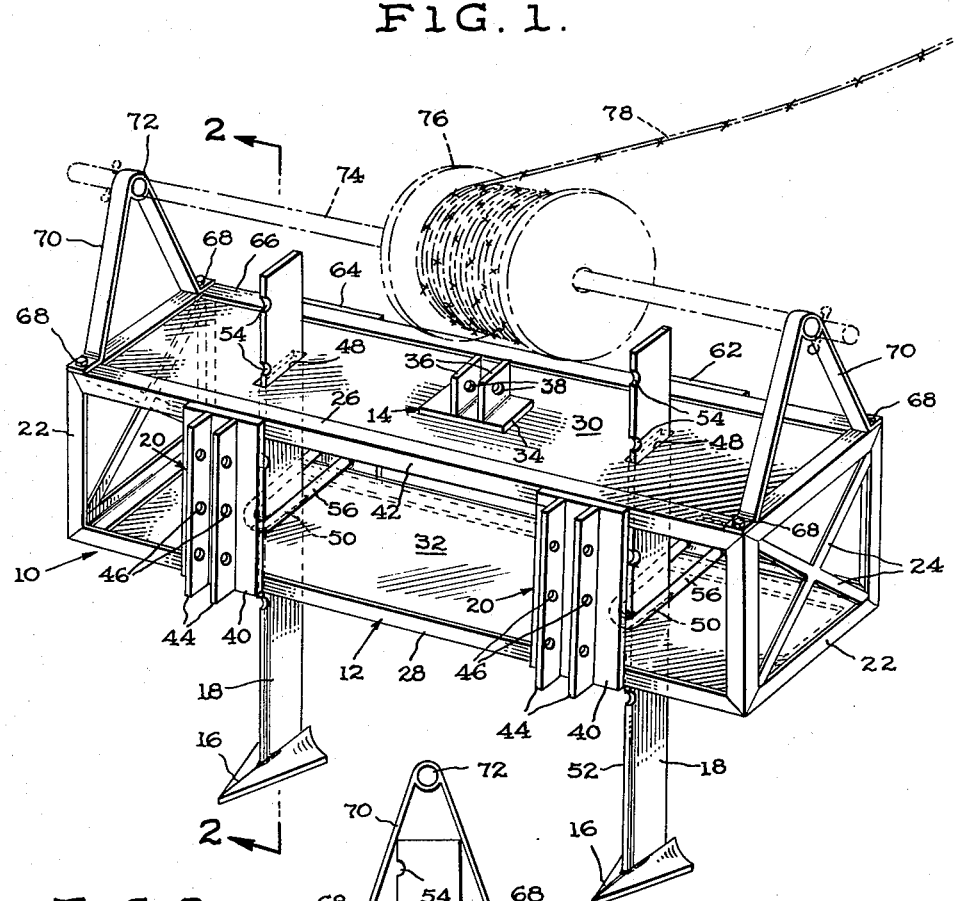
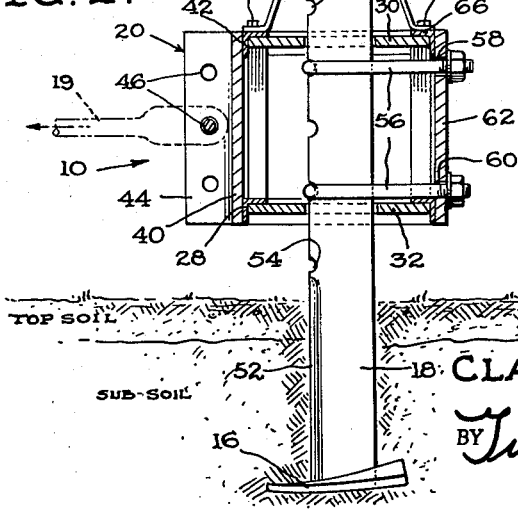
INVENTOR
CLARENCE E. DARNELL
BY *Gustave Miller*
ATTORNEY

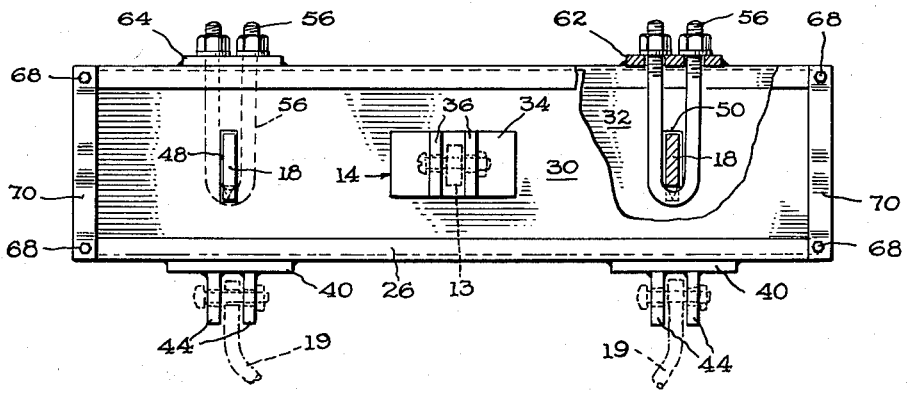
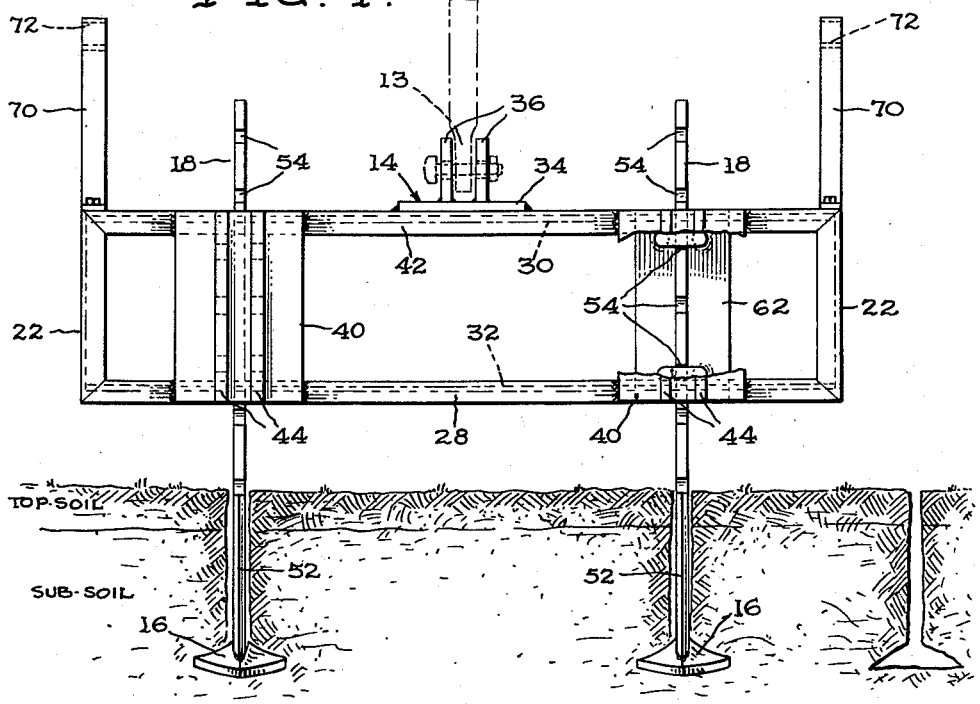

United States Patent Office 2,925,872
Patented Feb. 23, 1960

2,925,872

SUBSOILER FARM TOOL

Clarence E. Darnell, Curundu, Canal Zone

Application April 5, 1957, Serial No. 651,098

1 Claim. (Cl. 172—448)

This invention relates to a subsoiler farm tool and has for an object to provide an improved subsoiler farm tool, particularly intended for use as a subsoiler, but also capable of use as a combination tool for having other attachments provided thereon as may be desired.

A further object of this invention is to provide a subsoiler farm tool and particularly a subsoiler farm tool wherein the subsoiler plow may be regulated and adjusted to operate at different depths in the soil as desired.

A further object of this invention is to provide a subsoiler farm tool which is designed to break up the subsoil or hardpan which is generally 10" to 12" below the topsoil, and the hardpan is generally on an average of 12" to 14" thick, and is an object to break up the hardpan in order to permit rainfall and nitrogen to penetrate the topsoil and subsoil and in so doing, in a few years, the previous hardpan soil will dissolve out to consistency similar to the topsoil.

A further object of this invention is to provide a subsoiler farm tool which will loosen topsoil and hardpan soil to a depth of two feet or more, yet, which will not open up the topsoil enough to permit the topsoil to go down behind the plow shank and thus be lost from the top surface.

It has been found in the past that soil at a depth of 12" to 24" below the surface becomes hardened, due to the pressure of continued plowing, to such a degree that ordinary plowing will not break up the hard-packed earth but merely loosens up the soil. Moisture in the form of rain or other precipitation settles through a topsoil and when reaching the hard-packed earth commonly known as hardpan will run over the surface of the hardpan following the contours of the earth surface and thus be lost from the soil.

It is therefore an object of this invention to provide a subsoiler farm tool which will successfully break up the hardpan, then by permitting moisture and precipitation passing through the topsoil to seep into the subsoil strata, thereby maintaining the topsoil and the subsoil in condition to support plant life, and also, due to the fact that the moisture is retained and is thus gradually withdrawn to the topsoil during dry periods, it will prevent the topsoil from being removed by wind.

Still a further object of this invention is to provide a subsoiler farm tool which is arranged to have other attachments added thereto so that it may be used for other purposes around the soil, one such feature being a provision whereby a pair of spaced apart shaft-receiving brackets may be readily attached enabling the farm tool to be used in putting up fencing, the brackets serving to receive a shaft on which a spool of fence wire may be rotatably supported.

In brief, this invention comprises a weighted rectangular parallelepiped framework having a pair of subsoiler plows adjustably secured therethrough, and having hitching means on the top thereof substantially at the center of gravity thereof to which the hydraulic hoist means of a farm tractor may be secured for holding the framework at the desired height above the ground while on the forward part of the framework a pair of spaced apart tractor hitch receiving means is mounted for attaching to a tractor hitch from the tractor for drawing the subsoiler farm tool so that the subsoiler plows will pass through the hardpan or subsoiler at the proper desired depth.

With the above and related objects in view, this invention consists in the details of construction and combination of parts, as will be more fully understood from the following description, when read in conjunction with the accompanying drawing in which:

Fig. 1 is a perspective view of the subsoiler invention, also showing additionally how it can be used for laying out fence wire.

Fig. 2 is a sectional view on line 2—2 of Fig. 1.

Fig. 3 is a top plan view, partly broken away.

Fig. 4 is a front elevational view partly broken away.

There is shown at 10 the subsoiler farm tool of this invention. This subsoiler farm tool includes generally a rectangular parallelepiped framework 12, a lift hitch attaching means located above and in substantial alignment with the center of gravity, such lift hitch attachment being shown generally at 14, a pair of subsoiler plows 16 each mounted at the bottom of a plow shank 18 extending up through and secured in the framework 12.

In addition, the tool includes draft hitch attaching means shown generally at 20.

The framework 12 is of rectangular parallelepiped shape and is made up of a number of angle irons formed into rectangles and secured together as by welding or other suitable securing means. The framework extends transversely of the direction in which it will be operated when draft hitch means 19 are attached to the draft hitch receiving means 20.

The transverse end rectangles 22 are each provided with diagonally extending brace members 24 extending across both diagonals of the rectangle 22, the brace members 24 being preferably angle irons or channel irons, which of course are merely double angle irons so as to provide ample strength. Secured to the top rectangle 26 and to the bottom rectangle 28 is a top plate member 30 and a bottom plate member 32. The plate members 30 and 32 are of substantially weight, sufficient to provide rigidity and strength to the framework yet not so weighty as to make the tool unduly cumbersome. The plate members 30 and 32 are made preferably of boiler plate about five-eighths of an inch in thickness, with their transverse ends approximately 12" and their front and rear edges approximately 96". The end rectangles 22 are approximately 10" to 12" high and of course 12" wide corresponding to the width of the top rectangle and top plate member.

Mounted on the top plate member 30 as by welding or other suitable securing means substantially in alignment with the center of gravity of the tool is the hoist hitch receiving means 14 which as shown consists of a plate 34 secured at the center of top plate 30 and provided with a pair of upstanding spaced apart parallel plates 36 having centrally aligned apertures 38 therethrough for receiving the hitch pin of a hoist or lift hitch means 13, such hoist or lift hitch means 13 being attached to and controlled by the usual hydraulic hoist of a farm tractor, not shown.

The draft hitch attaching means 20 each consists of a vertically extending plate member 40 mounted as by welding to the angle irons of the front rectangle 42 in spaced apart relation, and each plate member 40 is provided with a pair of parallel forwardly extending plate members 44 each having three aligned apertures 46 through which the draft pin of a tractor hitch 19 may be secured, the three point attachment providing for suitable adjustment as desired.

The plow shanks 18 are preferably secured in alignment behind the draft hitch attaching means 20, and each shank 18 extends through a pair of aligned slots 48 and 50 in the top plate 30 and bottom plate member 32.

Substantially the lower half of the forward edge of the plow shank 18 is sharpened as to provide a cutting edge 52, while the upper portion of the forward edge is provided with a plurality of spaced notches 54 which cooperate with the securing means for holding the plow shanks 18 properly positioned and firmly secured in the framework 12. The means for securing each plow shank 18 are a pair of U bolts 56 which have their bights recessed in the notch 50 just below the upper plate member 30 and just above the lower plate member 32, and extend through a pair of aligned apertures 58 in vertically upstanding plate members 62 and 64 extending across the rear rectangle 66 and welded or otherwise secured to the angle irons thereof.

It will be observed that the rear rectangle plate members 62 and 64 are each in alignment with the plow shanks 18 and the front plate members 40 forming part of the draft hitch attaching means 20, and that these plate members 40, 62, and 64 serve to stiffen and reinforce the front and rear rectangles and thus the entire framework 12.

Each of the four corners of the upper rectangle 26 is apertured and arranged to receive a securing bolt 68 for attaching an inverted V-shaped bracket 70 having a shaft receiving journal 72 at its apex so that a shaft 74 may be mounted therethrough. This shaft 74 may serve as a support for a wire roll 76 from which a fencing wire 78 may be drawn when placing fencing around the farm.

In operation, the broiler plate members provide just sufficient weight and strength and yet give proper rigidity to the framework and weight to the plows 16, without making the entire device cumbersome, and enabling it to be handled and operated by the ordinary farm tractor. A double hitch 19 from the farm tractor will be selectively secured to the three-point hitch receiving means 20 as desired, while the hydraulic hoist 13 of the farm tractor will be attached by a hitch pin through the aligned apertures 38 in the hoist or lift receiving hitch 14. The plow shank 18 will be securely fastened by means of the U bolts and nuts 56 in proper position through their slots 48 and 50 and be held firmly therein, the U bolts being engaged selectively in the desired slots 54 so that the plow 16 will extend the desired distance below the framework 12, and then the subsoiling plowing operation will be provided by supporting the framework at the desired height from the hydraulic hoist of the tractor while traction is applied to the hitch receiving means 20. In this position, the brackets 70 may be left in position or may be removed. However, the shaft 74 will obviously be omitted except when being used in the fencing operation in the obvious manner, and when used in a fencing operation, the plow shanks 18 may be removed.

It will be further observed that the width of the plow shanks 18 extend in the direction of the operation so that the sharp edge 52 makes a very thin slit in the ground and thus does not provide a large opening through which the topsoil may be lost down in the subsoil, and instead the subsoil is broken up by the plow 16 and the sharp forward edge 52 of the plow shank 18 which also serves to cut through any underground roots that may be present.

Although this invention has been described in considerable details, such description is intended as being illustrative rather than limiting, since the invention may be variously embodied, and the scope of the invention is to be determined as claimed.

Having thus set forth and disclosed the nature of this invention, what is claimed is:

A combination subsoiler farm tool comprising a weighted framework, a lift hitch attaching means mounted on top of said framework in substantial alignment with the center of gravity thereof, a pair of spaced apart draft hitch attaching means mounted on the front of said framework, a pair of subsoiler plows and plow shanks, and spaced apart means in said framework adjustably securing each said plow shank to said framework, each said plow shank extending vertically through said framework, said framework comprising a rectangular parallelepiped of angle iron members extending transversely of the direction of operation, diagonal brace members reinforcing the end rectangles of said framework, weighted plate members secured in the top and bottom rectangles of said framework, said lift hitch attaching means being mounted on the top plate member, a pair of aligned slots in said top and bottom plate members through which said plow shanks are secured, said plow shank securing means comprising a pair of vertically extending plate members secured to the top and bottom angle irons of the framework rear rectangle, a pair of U bolts for each plow shank, said vertically extending plate members each having a pair of spaced apart pairs of U-bolt receiving apertures therethrough located adjacent the top and bottom ends thereof, whereby said U bolts may be secured about said plow shanks against the rear slot edges in said top and bottom plate members, said hitch attaching means comprising a pair of spaced apart plate members secured to the top and bottom angle irons of the framework front rectangle, a pair of parallel forwardly extending spaced apart hitch plates secured to each said front plate members for securing hitch means thereto, each corner of the framework upper rectangle being apertured and brackets mounted thereto at each transverse end of said upper rectangles.

References Cited in the file of this patent

UNITED STATES PATENTS

| | | |
|---|---|---|
| 1,064,265 | Waterman | June 10, 1913 |
| 1,100,920 | Seay | June 23, 1914 |
| 2,155,044 | Gray et al. | Apr. 18, 1939 |
| 2,638,832 | Kinsinger | May 19, 1953 |
| 2,703,518 | Whitmore | Mar. 8, 1955 |
| 2,797,629 | Kelley | July 2, 1957 |